US012300945B2

(12) United States Patent
Luzzi

(10) Patent No.: US 12,300,945 B2
(45) **Date of Patent: *May 13, 2025**

(54) SEPARABLE LOADBREAK DESIGN WITH ENHANCED RATINGS

(71) Applicant: Richards Mfg. Co., A New Jersey Limited Partnership, Irvington, NJ (US)

(72) Inventor: Glenn Luzzi, Mt. Bethel, PA (US)

(73) Assignee: Richards Mfg. Co. Sales, LLC, Irvington, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,597

(22) Filed: Sep. 8, 2023

(65) Prior Publication Data

US 2023/0420892 A1 Dec. 28, 2023

Related U.S. Application Data

(63) Continuation of application No. 17/741,810, filed on May 11, 2022, now Pat. No. 11,757,237, which is a continuation of application No. 17/249,765, filed on Mar. 12, 2021, now Pat. No. 11,349,266.

(60) Provisional application No. 63/198,105, filed on Sep. 29, 2020, provisional application No. 62/990,163, filed on Mar. 16, 2020.

(51) Int. Cl.
*H01R 13/703* (2006.01)
*H01R 13/53* (2006.01)

(52) U.S. Cl.
CPC ......... *H01R 13/7036* (2013.01); *H01R 13/53* (2013.01)

(58) Field of Classification Search
CPC ............................ H01R 13/7036; H01R 13/53
USPC ................................................. 439/181, 187
See application file for complete search history.

(56) References Cited

U.S. PATENT DOCUMENTS

| | | | | |
|---|---|---|---|---|
| 3,652,975 A | 3/1972 | Keto | | |
| 3,949,343 A | 4/1976 | Yonkers | | |
| 4,119,358 A | 10/1978 | Tachick | | |
| 4,175,817 A | 11/1979 | Tachick | | |
| 4,192,572 A | 3/1980 | Stanger | | |
| 4,773,872 A | 9/1988 | Borgstrom | | |
| 5,213,517 A | 5/1993 | Kerek | | |
| 5,266,041 A | 11/1993 | De Luca | | |
| 5,277,605 A | 1/1994 | Roscizewski | | |
| 5,393,240 A | 2/1995 | Makal | | |
| 5,445,533 A | 8/1995 | Roscizewski | | |
| 7,384,287 B2 | 6/2008 | Hughes | | |
| 7,491,075 B2 | 2/2009 | Hughes | | |
| 8,192,212 B2 | 6/2012 | Casses | | |
| 11,349,266 B2 * | 5/2022 | Luzzi | H01R 13/53 | |
| 11,757,237 B2 * | 9/2023 | Luzzi | H01R 13/53 | 439/187 |
| 2005/0260876 A1 | 11/2005 | Krause | | |
| 2007/0026713 A1 | 2/2007 | Hughes | | |
| 2007/0032110 A1 | 2/2007 | Hughes | | |
| 2008/0160809 A1 | 7/2008 | Hughes | | |
| 2009/0100675 A1 | 4/2009 | Hughes | | |
| 2011/0034051 A1 | 2/2011 | Kumar | | |

* cited by examiner

*Primary Examiner* — Gary F Paumen
(74) *Attorney, Agent, or Firm* — Nixon Peabody LLP

(57) ABSTRACT

A new and improved separable loadbreak connector system capable of providing higher switching and fault close ratings by various means of dividing the arc energy within the connector system.

18 Claims, 5 Drawing Sheets

SEPARABLE LOADBREAK DESIGN WITH ENHANCED RATINGS

CROSS-REFERENCE TO RELATED APPLICATIONS

This application is a continuation of U.S. application Ser. No. 17/741,810, filed May 11, 2022, which is a continuation of U.S. application Ser. No. 17/249,765, filed Mar. 12, 2021, now issued as U.S. Pat. No. 11,349,266, which claims the benefit of and priority to U.S. Provisional Patent Application No. 63/198,105, filed Sep. 29, 2020, and U.S. Provisional Patent Application No. 62/990,163, filed Mar. 16, 2020, each of which is hereby incorporated by reference herein in its entirety.

BACKGROUND OF THE INVENTION

The present disclosure relates to high power switching systems for electric power systems and more specifically, to a separable loadbreak system to interface electrical apparatus and power distribution cables. The separable loadbreak system of the present invention achieves enhanced ratings by providing multiple contact points which simultaneously make contact at the same time, reducing the arc energy at each contact point. The apparatus connector assembly embodied in the present invention is adapted to operatively associate with various power distribution connector assemblies, including existing loadbreak elbows and probes, existing elbows with an enhanced probe disclosed herein, and/or novel loadbreak elbows and enhanced probes.

Electrical power is typically transmitted from substations through cables which interconnect other cables and electrical apparatus in a power distribution network. The cables are typically terminated on bushings that may pass through walls of metal encased equipment such as capacitors, transformers, or switchgears. The electrical apparatus provides the apparatus connector assembly fixed thereto, typically proximate a bushing thereof. The power distribution connector assembly is separable from and movable relative to the apparatus connector assembly. Engaging and disengaging said connector assemblies—by way of the separable loadbreak system—achieves electrical connection or disconnection of the electrical apparatus to and from the power distribution network.

Currently, 200 ampere separable loadbreak connectors can connect medium voltage cables to transformers or switches. The cables effectively covered by these 200-ampere class of loadbreak connectors are currently limited to 4/0 maximum. Even at this upper range of conductor class, the safe operation of the devices is limited to 200 amperes steady-state, 200 amperes overload current and 10 kA fault current while the connected cables might have ratings twice those values. These ratings are limited by the current loadbreak separable connector designs.

In addition to the above-mentioned use, the 200-ampere class of separable connectors are also used as taps for 600 ampere "dead break" class of separable connectors. Here, current systems can provide usual fault currents as high as 25 kA. In these applications it is essential to ensure the 200-ampere rated device is operated within the ratings stated above, or more likely, not operated live. Moreover, the 600 ampere "dead break" class of separable connector can never be operated live.

Utilities have long been seeking higher rated 200 ampere loadbreak devices as well as 600-amperes load breakable devices so they can expand the versatility, safety, ampacity and reliability of their systems. One such offering is disclosed in U.S. Pat. No. 7,384,287. Unfortunately, this device cannot assist in the upper ratings of the standard class of connector in which there is considerable infrastructure with space limitations. It is also a difficult device to operate since it requires separating two interfaces simultaneously with a linking device.

The industry specification for these devices, IEEE 386, requires testing loadbreak devices to their highest ratings and further allows testing failures, resulting in a very reliable connector system but, however, not 100% reliable at the upper ratings.

Separable loadbreak connectors are operable in "loadmake", "loadbreak", and "fault close" conditions. Considerable arcing can occur, though, in any of the operating conditions when energized connectors are joined and separated. A utility or any operator of electric power systems must take adequate precautions to ensure the system does not exceed the ratings of the connector components in instances where the cable ratings exceed those of the connectors. Therefore, a limitation in any separable device is controlling and/or limiting the duration and/or intensity of the arcing between the apparatus connector assembly and the power distribution connector assembly during the loadmake and loadbreak conditions. In other words, it would be desirable to reduce arc energy density as the connectors are mated and separated.

Typically, the apparatus connector assembly provides a bushing female-contact assembly while the power distribution connector assembly includes an elbow probe. With these assemblies, during loadmake operation, arcing occurs when the conductive portion of the probe reaches a distance to the female contact where the air breaks down from the applied voltage. Arcing continues during the loadmake operation until the conductive portion of the probe contacts the female contact. During a fault close or i.e.; a loadmake operation under fault conditions, in certain embodiments, the bushing female-contact assembly may have a piston assembly to close the arcing gap more quickly.

As can be seen, there is a need for a separable loadbreak system operable in a safe, versatile, and reliable manner, wherein the separable loadbreak system is operable with existing loadbreak elbows and probes as well as being adaptable with novel enhanced probe designs, while producing enhanced ratings through reducing arcing time and energy during the load-make operation. These enhanced ratings are achievable with loadbreak elbow/bushing combinations capable of passing all requirements of IEEE 386 without the need for failure allowances as is currently allowed in the specification. Embodiments of the present disclosure are directed to this and other considerations, including but not limited to switchgear applications.

SUMMARY OF THE INVENTION

In one aspect of the present invention, a loadbreak connector assembly for operatively associating with two spaced apart conductive portions, the loadbreak connector assembly includes the following: a first contact zone collinear with and spaced apart from a second contact zone by an insulated zone, wherein the second contact zone is mechanically fixed relative to the first contact zone, wherein the insulated zone provides insulation and isolation relative to the first and second contact zones until immediately prior to contact of each contact zone by the two spaced apart conductive portions, breaking an electrical connection under energized circuit conditions, whereby an arcing time of a broken electrical connection is limited, wherein one conductive portion of the two spaced apart conductive portions comprises (a) a floating contact slidable between the first and second contact zones; and the other conductive portion of the two spaced apart conductive portions (b) a separate probe associated with an elbow connector, wherein the said two spaced apart conductive portions are a conductive portion of the floating contact and a conductive portion of the separate probe, wherein the separate probe is in accordance with ANSI/IEEE 386, and wherein the two spaced apart conductive portions comprise a multi-piece probe (e.g., three piece or four piece) having in sequence: a proximal conductive portion, a distal arc-quenching portion, and a distal conductive portion, wherein said two spaced apart conductive portions are the proximal conductive portion and the distal conductive portion. In another embodiment, the multi-piece probe includes a proximal arc-quenching portion proximal of the proximal conductive portion.

In another aspect of the present invention, a method of reducing an arcing distance when making or breaking an electrical connection under energized circuit conditions in a power switching system, the method includes the following: spacing two contact zones of one loadbreak connector by a gap distance; fixing the two contact zones collinearly relative to each other; and insulating the gap distance.

These and other features, aspects and advantages of the present invention will become better understood with reference to the following drawings, description and claims.

BRIEF DESCRIPTION OF THE DRAWINGS

FIGS. 1A and 1B shows the present invention utilizing an industry standard probe in an initial starting position with no probe contact of a floating contact, illustrating a pre-arc condition, wherein FIG. 1A shows an embodiment with a piston assembly and FIG. 1B shows an embodiment with no piston assembly;

FIGS. 2A and 2B shows the present invention utilizing an industry standard probe making initial contact to the floating contact, illustrating an arcing initiating condition, wherein FIG. 2A shows an embodiment with a piston assembly and FIG. 2B shows an embodiment with no piston assembly;

FIGS. 3A and 3B shows the present invention utilizing an industry standard probe with the probe and floating contact fully inserted, illustrating an arcing terminated condition, wherein FIG. 3A shows an embodiment with a piston assembly and FIG. 3B shows an embodiment with no piston assembly;

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1A:
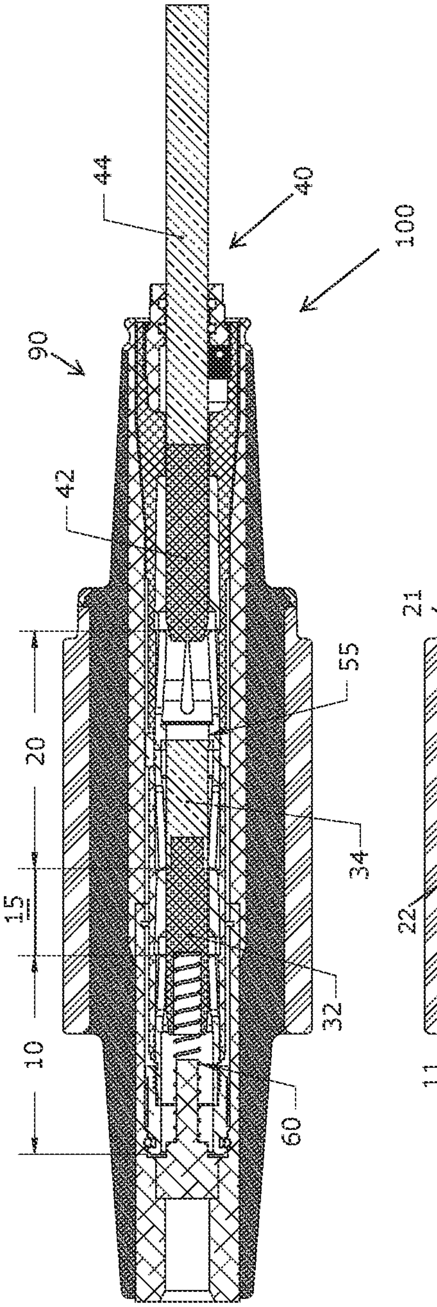

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Referring now to FIGS. 1 through 8, the present invention may include a separable loadbreak system 100. The separable loadbreak system 100 may include an apparatus connector assembly 90 operable with various power distribution connector assemblies, including loadbreak elbow assemblies 95 with a standard IEEE probe 40 or a non-standard four-piece probe 80. It is also contemplated that the power distribution connector assemblies may be of other types and configurations in other embodiments.

In some embodiments, the separable loadbreak system 100 embodies a device configured to replace a typical single-interface 200 ampere rated separable component. For cable sizes and ratings up to and including 4/0 the components can be 200-amp loadbreak rated bushings, IEEE 386, interfaces 5, 7A, 7B, 8 or 9. The mating elbows for these bushings could be current design configurations up to 4/0, or similar elbows with larger cable entrances for larger cable sizes. It is also possible to utilize IEEE 386, 600 ampere rated bushings, interfaces 11 to 15 for larger cable sizes and/or higher ratings.

Figure 3A:
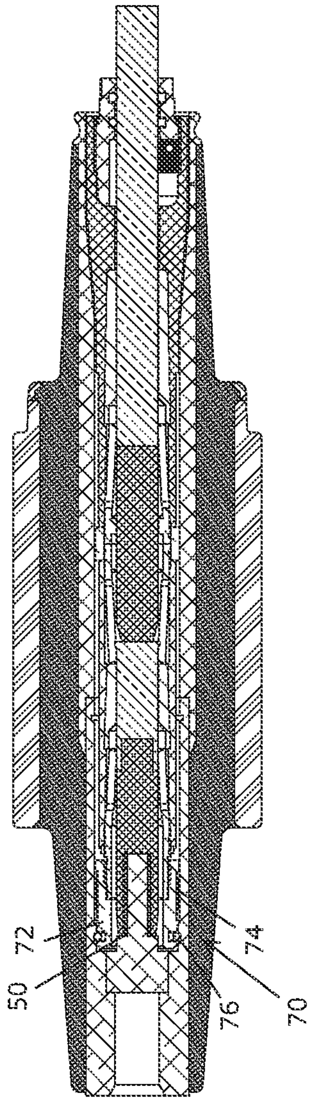
Figure 1B:
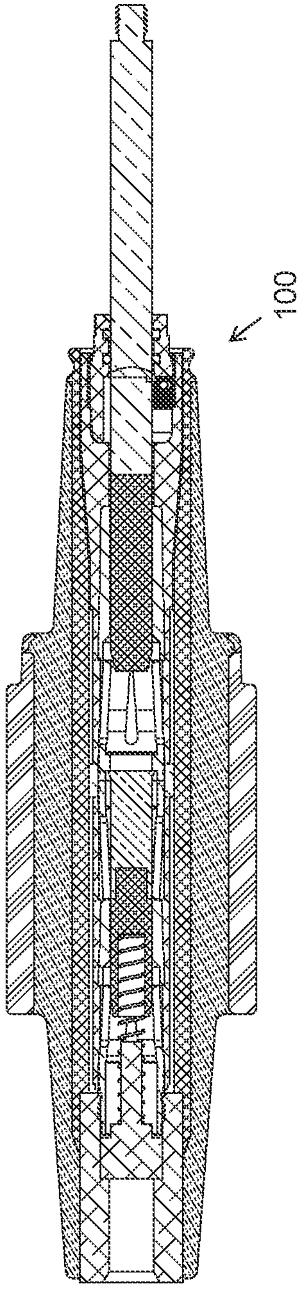

The apparatus connector assembly 90 may embody a bushing assembly having an internal current-carrying design where current loadbreak bushings utilize a fixed female contact electrically connected to the 200-ampere bushing well, 600-ampere contact or other mating devices. In some embodiments, a piston assembly may interconnect the fixed female contact and the 200-ampere bushing well, the 600-ampere bushing contact or other mating devices. The piston assembly 70 may include a piston 72, a louver 74 and a locking clip 76, as illustrated in FIG. 3A. It is understood that other positioning and/or actuating elements and mechanisms could be employed in lieu of the piston assembly 70 and in fact that there are other movable piston contact methods besides a louver-type contact. And it is understood that the piston assembly 70 and other movable piston contact methods are optional.

The internal current-carrying design of the apparatus connector assembly 90 may be embodied in a bushing assembly wherein the current-carrying portion divided into two (2) separate current-carrying zones spaced apart in series by an insulated zone 15 defining a gap distance.

The current-carrying zones, a first zone 10 and a second zone 20, are electrically isolated from each other by way of the insulated zone 15. The current-carrying zones 10 and 20 are made from electrically conductive material that may be tubular in shape, wherein the tubular tapers in diameter with the smaller diameter located to engage cylindrical contacts or probes. In the Figures, the first zone 10 provides a female contact surface 11, and the second zone 20 provides a first, distal female contact surface 21 and a second, proximal female contact surface 22. Other contact methods are contemplated by the present invention, including but not limited to louvers (74), canted springs, conductive rings, a tulip-type contact method, other circumferential contact methods, or the like.

The first zone 10 may be adjacent a predetermined stop point 50, as illustrated in FIG. 3A. The stop point 50 is contact-max position, the farthest forward that the elbow/probe/floating contact might reach during the load-make operation due to the forward momentum of the operator. The stop point 50 may be operatively associated with a spring 60 adapted to, for instance, returning the floating contact to the original position, as illustrated in FIG. 1A.

For the sake of clarity, and since the first zone 10 is considered 'proximal' as it is associated with a proximal end of the apparatus connector assembly 90, while the second zone 20 is considered 'distal' as it is associated with a distal end of the apparatus connector assembly 90. The terms 'proximal' and 'distal' should be based on this understanding.

Figure 2A:
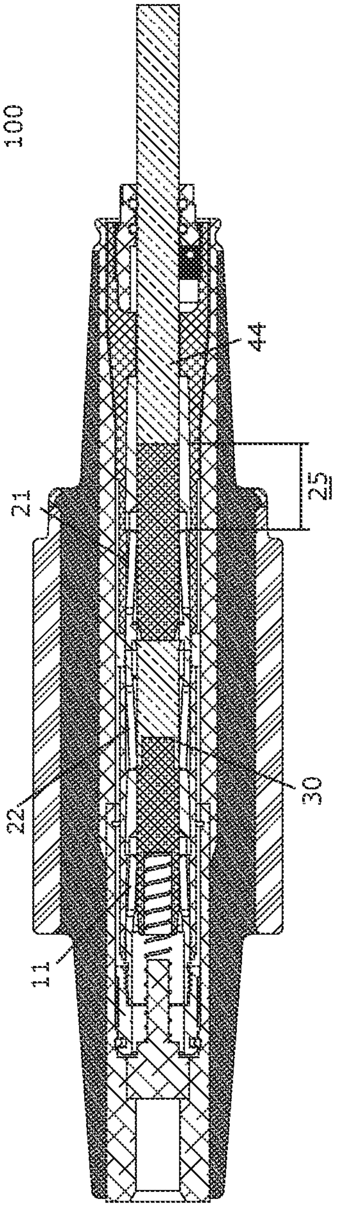

The first zone 10 may be electrically connected to the 200-ampere bushing well or the 600-ampere bushing contact as in current designs. The second zone 20 of the enhanced design is mechanically fixed distal of the first zone 10 a gap distance defined by the insulated zone 15. The gap distance will be a function of several things including: the specific voltage or voltage class the product is designed for. This could be 15, 25 or 35 kV class; 15, 25 or 35 kV applied voltage from the elbow probe to the bushing insert for a 3-phase rated device; 8.7, 15.5 or 21.1 kV for a single-phase rated device. For instance, over simulated 25 kV applied voltage testing (a 3-phase voltage for a 25 kV class product), the range of total gap distance of the insulated zones (15 plus 25) may be on the order of 0.25 inches to 1.4 inches. One-half of the voltage from the probe to the bushing well is "withstood" across zone 15 while the remaining half of the voltage is withstood across a second gap 25 from the second zone 20 to the probe conducting portion 44, as illustrated in FIG. 2A. The insulative zone 15 may include electrically insulative type material or arc quenching material. In other words, the gap distance—i.e., zone 15 "or" 25—is approximately equal tot the flashover distance in air for the applied voltage of the connector under design.

In other embodiments with more than two contact zones, each discrete gap distance could be further reduced. For example, an embodiment with three contact zones would have a gap distance ⅓ the flashover distance and proportionally reduced voltage withstand across the insulating zones.

Floating Contact Design Operation

Referring to FIGS. 1A through 3B, there may be a floating contact 30 operatively associable with the first, insulated, and second zone 10, 15, and 20, respectively, through being disposed in at least one lumen of the female contact surfaces 11 and 21 and 22 and slidably through both, as well as being slidable through female contact surface associated with the insulated zone 15. The floating contact 30 includes an arc-quenching portion 32 and a conductive portion 34 of equivalent or larger ampacity relative to the existing elbow probe 40. When an existing probe 40 is not interfacing with the floating contact 30, as illustrated in FIGS. 1A and 1B, the conductive portion 34 of the floating contact 30 may be disposed inside the second proximal contact surface 22 of the second zone 20 and the arc-quenching portion 32 may be disposed in a lumen and fixed female contact surface associated with the insulated zone 15. In other words, the arc-quenching portion 32 may protrude from the proximal fixed contact surface 22 towards the first zone 10 prior to the floating contact 30 interfacing with the probe 40.

Figure 2B:
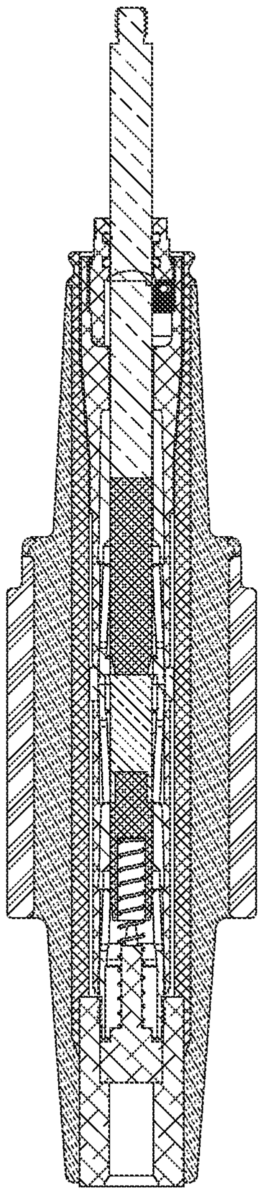
Figure 3B:
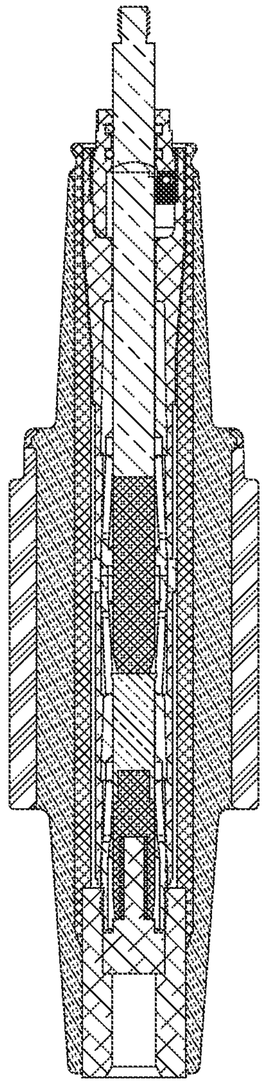
Figure 4:
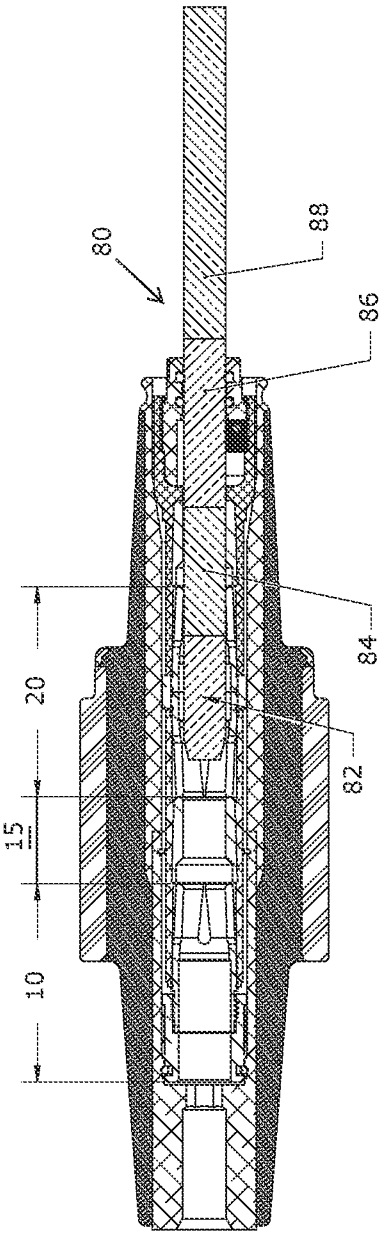
FIG. 4 shows the present invention in an initial starting position with no contact of a four-piece probe, illustrating a pre-arc condition.

The method of joining the floating contact 30 and the probe 40 under energized circuit conditions completes the electrical connection to the apparatus, while separating the floating contact 30 and the probe 40 disconnects the electrical connection to the apparatus. When an existing probe 40 is closed onto the bushing, as illustrated in FIGS. 2A and 2B, the arc-quenching portion 42 of the existing elbow probe 40 contacts and urges the conductive portion 34 of the floating contact 30 toward the stop point 50, whereby the conductive portion 34 ultimately closes the connection between the first zone 10 and the second zone 20, as illustrated in FIGS. 3A and 3B, while the conductive portion 44 of the existing elbow probe 40 simultaneously electrically associates with the second zone 20, thereby resulting in the termination of the arc.

If additional closing speed is necessary or desirable for even higher closing currents or higher fault close capabilities, such additional closing speed may be enabled by the aforementioned piston assembly 70 for closing gaps 15 and 25.

The conductive portions 34 and 44 may be made of conductor material, such as copper or a copper alloy. The arc-extinguishing portions 32 and 42 may be made of ablative material, such as acetal co-polymer resin loaded with finely divided melamine. The ablative material may be injection molded on an epoxy bonded glass fiber reinforcing pin.

In a load-break operation, the floating contact 30 would return to the original position within the floating female contact of second zone 20 as the elbow probe 40 is being removed. The force to return the floating arc-quenching/metallic contact can be provided, for instance, by means a coil-spring 60 or, in other embodiments, simply by the gas pressure developed during arcing, or by an actuating mechanism. Accordingly, a stop feature 55 may be disposed adjacent the distal end of the floating contact 30 to contain the floating contact 30 in an appropriate position within the bushing, Four-Piece Probe Design Operation A new four-piece probe 80 operatively associated with the elbow probe may include a proximal arc-quenching portion 82, a proximal conductive portion 84, a distal arc-quenching portion 86, and a distal conductive portion 88 in series. In use, the proximal arc-quenching portion 82 first enters the fixed female contact surface 21 of the second zone 20 as the elbow 95 is closed. As the elbow 95 and thus the four-piece probe 80 continues forward, the now operatively associated proximal arc-quenching portion 82 and the proximal conductive portion 84 begins to electrically bridge the first zone 10 and the second zone 20 over the insulated zone 15.

Figure 5:
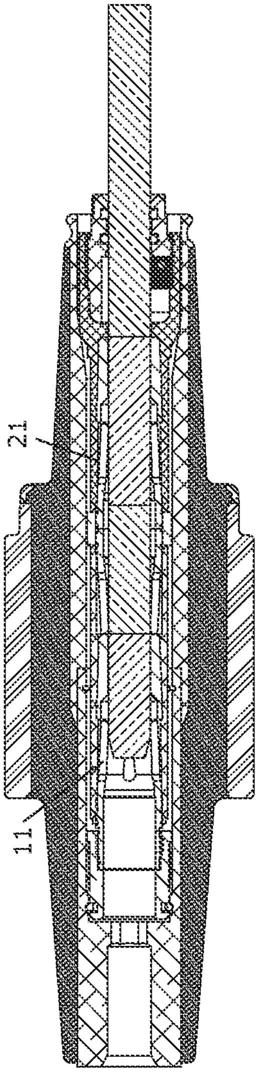
FIG. 5 shows the present invention with the four-piece probe contacting partially inserted, illustrating an arcing initiating condition.
Figure 6:
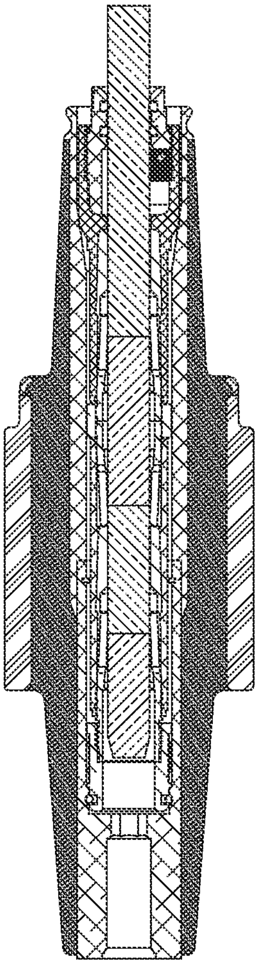
FIG. 6 shows the present invention with the four-piece probe fully inserted, illustrating an arcing terminated condition.
Figure 7:
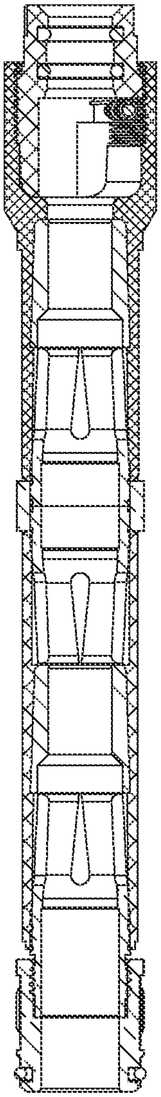
FIG. 7 shows a movable assembly, depicting all the components that may be tied together in the single, piston-activated assembly of the no contact of a four-piece probe embodiment of the present invention, clarifying the entire piston assembly.
Figure 8:
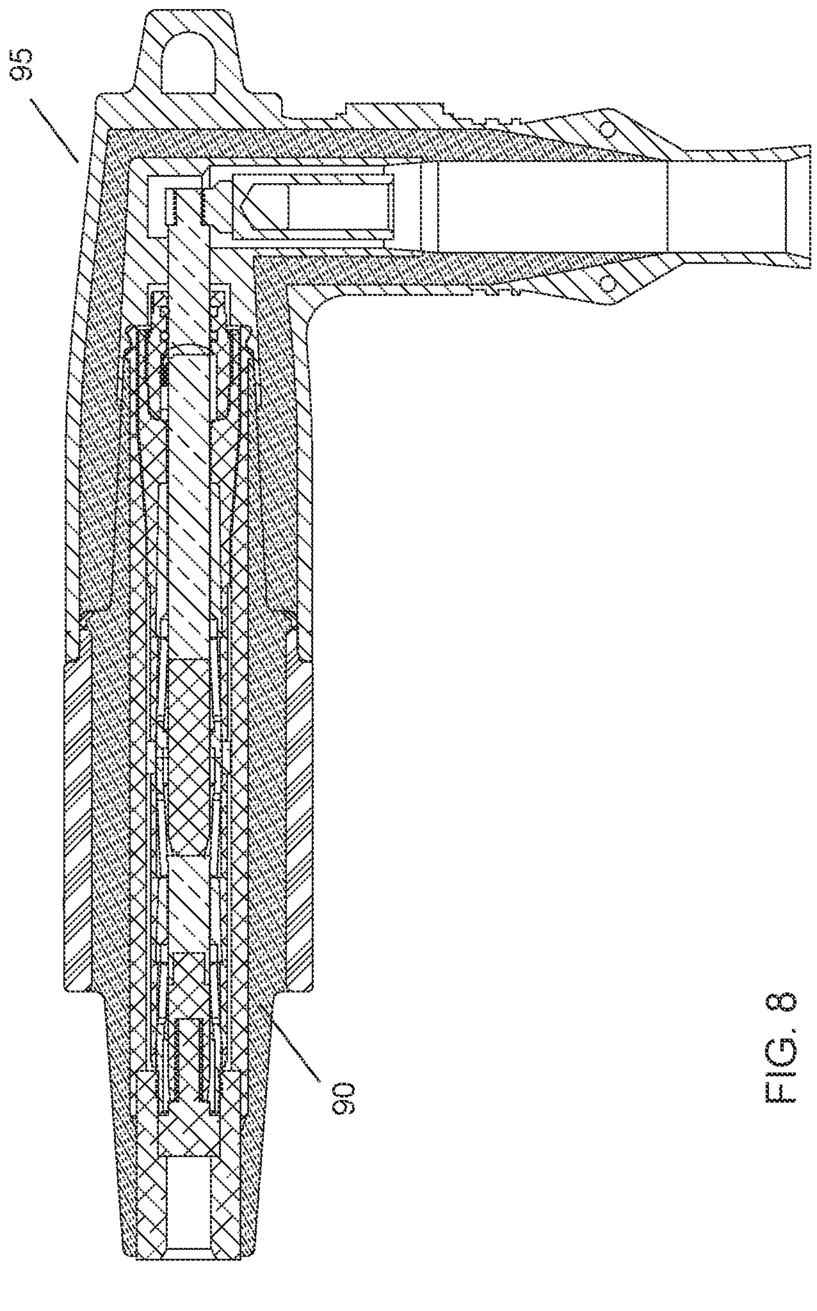
FIG. 8 shows the present invention with a prior art elbow 95 installed onto one of the bushing configurations.

The proximal conductive portion 84 of the four-piece probe 80 exits the proximal end portion of the second zone 20 as the distal conductive portion 88 approaches the distal end portion of the second zone 20, as illustrated in FIG. 5. At this location an arc forms from the contact surface 11 of the first zone 10 to the proximal conductive portion 84 and a separate arc forms from the mechanically fixed contact surface 21 of the second zone 20 to the distal conductive portion 88 of the four-piece probe 80. From this point on during the elbow 95 closing, arcing continues until the proximal conductive portion 84 contact the proximal current-carrying first zone 10, while simultaneously the distal conductive portion 88 contacts the fixed contact surface 21 of the second zone 20. At this point in the operation arcing stops. Arcing time in this enhanced design is ½ the arcing time of current design connectors, reducing the arc energy to half.

Additional enhancements if required would provide both the inner bushing contact and the floating contact to be piston-type as in current designs, which would close the X/2 gaps faster as a result of the arc pressure.

Another enhancement may be the elimination of arc-quenching portion, 82, if it is determined that any arcing occurring to 84 is minimal and will not affect the current-carrying operation of 84 throughout the operating life of the connector. The issue with arcing is the accumulation of damage during each of the load break and load make operations; if the damage is minimal in this enhanced design, there may be no need to provide 82.

One further benefit of this method of dividing the arc is that it lends itself to additional options such as dividing the arc into three (3) or more sections thus further increasing operable ratings.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to “one embodiment,” “an embodiment,” “some embodiments,” “example embodiment,” “various embodiments,” “one implementation,” “an implementation,” “example implementation,” “various implementations,” “some implementations,” etc., indicate that the implementation(s) of the disclosed technology so described may include a particular feature, structure, or characteristic, but not every implementation necessarily includes the particular feature, structure, or characteristic. Further, repeated use of the phrase “in one implementation” does not necessarily refer to the same implementation, although it may.

Throughout the specification and the claims, the following terms take at least the meanings explicitly associated herein, unless the context clearly dictates otherwise. The term “connected” means that one function, feature, structure, or characteristic is directly joined to or in communication with another function, feature, structure, or characteristic. The term “coupled” means that one function, feature, structure, or characteristic is directly or indirectly joined to or in communication with another function, feature, structure, or characteristic. The term or is intended to mean an inclusive “or.” Further, the terms “a,” “an,” and “the” are intended to mean one or more unless specified otherwise or clear from the context to be directed to a singular form. By “comprising” or “containing” or “including” is meant that at least the named element, or method step is present in article or method, but does not exclude the presence of other elements or method steps, even if the other such elements or method steps have the same function as what is named.

As used herein, unless otherwise specified the use of the ordinal adjectives “first,” “second,” “third,” etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A loadbreak connector assembly for use with a moveable probe having a probe-conducting portion, comprising:

a first contact zone;

a second contact zone that is spaced apart from the first contact zone, each of the first and second contact zones including electrically conductive material, the second contact zone being in a fixed position relative to the first contact zone;

an insulated zone located between the first contact zone and the second contact zone; and wherein, in response to the probe being moved relative to the second contact zone, electrical contact is made between (i) the probe conducting portion and the second contact zone and between (ii) the first contact zone and the second contact zone.

2. The loadbreak connector assembly of claim 1, further including a floating contact moveable relative to the first and second contact zones, the floating contact provides the electrical contact between the first contact zone and the second contact zone in response to the probe being moved.

3. The loadbreak connector assembly of claim 2, wherein the probe directly engages and moves the floating contact as the probe advances from a first position to a second position within the second contact zone.

4. The loadbreak connector assembly of claim 1, wherein the probe includes an arc-quenching portion that engages the floating contact, the arc-quenching portion separating the floating contact from the probe conducting portion.

5. The loadbreak connector assembly of claim 1, wherein the second contact zone has two female contact regions, one female contact region for engaging the floating contact and the other female contact region for engaging the probe conducting portion.

6. The loadbreak connector assembly of claim 1, wherein the probe is configured in accordance with ANSI/IEEE 386.

7. The loadbreak connector assembly of claim 2, further include a spring system coupled to the floating contact for urging the floating contact back to an initial position for the floating contact when the probe moves back to its original position.

8. The loadbreak connector assembly of claim 2, wherein the floating contact further includes an arc-quenching portion.

9. The loadbreak connector assembly of claim 1, further including an arc-quenching portion located within the insulated zone when the probe is in its original position.

10. The loadbreak connector assembly of claim 1, wherein an arc density when making or breaking an electrical connection within the connector assembly is divided between (i) the electrical contact at the probe conducting portion and the second contact zone, and (ii) the electrical contact at the first contact zone and the second contact zone.

11. The loadbreak connector assembly of claim 1, wherein the probe is a multi-piece probe having a proximal conductive portion, a distal conductive portion, and an arc-quenching portion located between the proximal conductive portion and the distal conductive portion.

12. The loadbreak connector assembly of claim 11, wherein the multi-piece probe further comprises a proximal arc-quenching portion proximal of the proximal conductive portion.

13. The loadbreak connector assembly of claim 11, wherein, in response to the probe being advanced from a first position to a second position, the proximal conductive portion makes the electrical contact between (ii) the first contact zone and the second contact zone.

14. The loadbreak connector assembly of claim 13, wherein the distal conductive portion is the probe conducting portion making the electrical contact with the second contact zone in response to the probe being advanced to the second position.

15. A loadbreak connector assembly, comprising:

a first contact zone;

a second contact zone that is spaced apart from the first contact zone, each of the first and second contact zones including electrically conductive material, the second contact zone being in a fixed position relative to the first contact zone, the second contact zone is capable of receiving a moveable conductor;

an insulated zone located between the first contact zone and the second contact zone; and wherein, in response to the conductor moving relative to the second contact zone, electrical contact is made between (i) the conductor and the second contact zone and between (ii) the first contact zone and the second contact zone.

16. The loadbreak connector assembly of claim 15, further including a floating contact moveable relative to the first and second contact zones.

17. The loadbreak connector assembly of claim 16, wherein the electrical contact between the first contact zone and the second contact zone is caused by a moving the floating conductive contact that directly contacts the first and second contact zones.

18. The loadbreak connector assembly of claim 16, wherein the moving of the floating conductive contact is caused by moving of the conductor in the connector assembly.

* * * * *